United States Patent
Yang et al.

(10) Patent No.: US 10,494,001 B2
(45) Date of Patent: Dec. 3, 2019

(54) SELF-LOCKING ANTI-SLIP RAIL BRAKING DEVICE

(71) Applicant: WUHAN K-CRANE OCEAN LIFTING TECHNOLOGY CO., LTD., Wuhan (CN)

(72) Inventors: Zhong Yang, Wuhan (CN); Yongzhi Li, Wuhan (CN); Lei Wang, Wuhan (CN); Zhihui Hu, Wuhan (CN); Jianmin Yuan, Wuhan (CN); Gongxian Wang, Wuhan (CN)

(73) Assignee: WUHAN K-CRANE OCEAN LIFTING TECHNOLOGY CO., LTD., Wuhan (CN)

( * ) Notice: Subject to any disclaimer, the term of this patent is extended or adjusted under 35 U.S.C. 154(b) by 246 days.

(21) Appl. No.: 15/646,183

(22) Filed: Jul. 11, 2017

(65) Prior Publication Data
US 2018/0057025 A1 Mar. 1, 2018

(30) Foreign Application Priority Data
Aug. 30, 2016 (CN) .......................... 2016 1 0764110

(51) Int. Cl.
| | |
|---|---|
| *B61H 7/12* | (2006.01) |
| *F16D 63/00* | (2006.01) |
| *B60T 1/14* | (2006.01) |
| *B60T 8/17* | (2006.01) |
| *B66C 9/18* | (2006.01) |
| *F16D 127/10* | (2012.01) |

(52) U.S. Cl.
CPC .................. *B61H 7/12* (2013.01); *B60T 1/14* (2013.01); *B60T 8/1705* (2013.01); *B66C 9/18* (2013.01); *F16D 63/008* (2013.01); *F16D 2127/10* (2013.01)

(58) Field of Classification Search
CPC .. B66C 9/18; B61H 7/12; B61H 11/02; F16D 63/008; F16D 2127/10
USPC .......................................................... 188/43
See application file for complete search history.

(56) References Cited

U.S. PATENT DOCUMENTS

| | | | | |
|---|---|---|---|---|
| 1,297,083 A | * | 3/1919 | Brown ..................... | B61H 7/00 105/61 |
| 2,928,502 A | * | 3/1960 | Troften .................... | B61H 7/04 188/127 |

(Continued)

*Primary Examiner* — Bradley T King
*Assistant Examiner* — James K Hsiao
(74) *Attorney, Agent, or Firm* — Tim Tingkang Xia, Esq.; Locke Lord LLP

(57) ABSTRACT

A self-locking anti-slip rail braking device is provided. The rail braking device includes a ladder-shaped support, a lifting unit, a roller-and-wedge plate mechanism, a roller support, and a rail clamping unit. The ladder-shaped support is connected under a surface of a balance beam of a port facility, and is connected at a middle part thereof with the lifting unit. A lower end of the lifting unit is hinged to two sides of the roller support. The roller support is provided on an upper end surface thereof with the roller-and-wedge plate mechanism, and is provided at a middle part thereof with the rail clamping unit. An upper end of the rail clamping unit serves as a force application end and is configured to match the roller-and-wedge plate mechanism, and a lower end of the rail clamping unit serves as a rail clamping end corresponding to two lateral sides of a rail.

8 Claims, 15 Drawing Sheets

(56) References Cited

U.S. PATENT DOCUMENTS

| | | | | |
|---|---|---|---|---|
| 3,217,367 A | * | 11/1965 | Gary | B61H 7/04 188/41 |
| 3,339,675 A | * | 9/1967 | Bingham | B61B 5/02 188/153 A |
| 3,433,366 A | * | 3/1969 | White | B66C 19/002 188/203 |
| 3,715,048 A | * | 2/1973 | Raab | B66C 13/00 414/626 |
| 3,807,532 A | * | 4/1974 | Molt | B61K 7/16 104/258 |
| 3,877,549 A | * | 4/1975 | Clark, Jr. | B66C 9/18 188/38 |
| 3,972,392 A | * | 8/1976 | Johnson | B60T 13/22 188/43 |
| 4,236,608 A | * | 12/1980 | Kobelt | B61H 7/12 188/43 |
| 4,308,937 A | * | 1/1982 | Johnson | B61H 7/12 104/17.1 |
| 8,453,802 B1 | * | 6/2013 | Simpson | B60T 1/14 105/148 |
| 10,071,882 B2 | * | 9/2018 | Duvall | B66B 5/18 |
| 2001/0052439 A1 | * | 12/2001 | Breitfeld | B60T 7/22 188/33 |
| 2009/0183956 A1 | * | 7/2009 | Berliant | B61H 7/12 188/43 |
| 2011/0083927 A1 | * | 4/2011 | Herges | F16D 65/18 188/72.2 |
| 2012/0241262 A1 | * | 9/2012 | Bourhill | B60T 13/22 188/43 |
| 2013/0112645 A1 | * | 5/2013 | Laliberte | B61H 5/00 212/312 |
| 2015/0183621 A1 | * | 7/2015 | Koch | B66C 17/20 212/315 |
| 2016/0039642 A1 | * | 2/2016 | Ogasawara | B66C 9/18 188/41 |
| 2018/0037443 A1 | * | 2/2018 | Murdoch | B60T 1/14 |

* cited by examiner

SELF-LOCKING ANTI-SLIP RAIL BRAKING DEVICE

CROSS-REFERENCE TO RELATED APPLICATION

This non-provisional application claims priority to and benefit of, under 35 U.S.C. § 119(a), Chinese Patent Application No. 201610764110.4, filed Aug. 30, 2016 in the State Intellectual Property Office of P.R. China, which is hereby incorporated in its entirety by reference.

FIELD OF THE INVENTION

The present disclosure relates to the technical field of engineering machinery, and in particular, to a self-locking anti-slip rail braking device.

BACKGROUND OF THE INVENTION

Large port equipment such as bridge cranes, portal cranes, and gantry cranes are usually operated in open air near the sea. In recent years, extreme weather like tornadoes and hurricanes frequently occur in coastal areas. A port facility is often subjected to a wind large load due to such extreme weather as well as its large windward area. The port facility, forced by the wind load, moves along its rail in an accelerated manner until it comes to the end of the rail and crashes into a retaining plate at the end of the rail. In this case, a capsizing moment produced by the inertial force is far larger than an anti-capsizing moment produced by the dead weight of the port facility. This usually leads to severe safety accidents such as capsizing of the port facility. In order to prevent port facilities from being moved or blown down by wind when a large wind load is applied thereon, regulations are provided by relevant administrative departments stating that all facilities operated near the sea shall be equipped with safe and reliable anti-slip devices. Anti-slip devices currently used for port facilities mainly include three types: anchor-type, rail braking-type, and rail clamping-type.

An anchor-type anti-slip device is used to fix and limit a port facility in a given place by an anchor and a retaining unit such as support wires. The device is simple in structure and is reliable. However, it is only along the rail that a plurality of anchoring points can be arranged. When a strong wind comes, the port facility has to be moved to anchoring bolts, which is not convenient and it is not always possible to timely stop and anchor the facility, especially in a case of gusty wind.

A rail braking-type anti-slip device is used to enable part of the dead weight of the port facility to be loaded on the top of the rail by using an auxiliary device, thus providing an increased friction between the port facility and the top of the rail for resisting wind. Such a device is simple in structure and convenient to operate, but the increase of the friction can be achieved only through the dead weight of the device. The device has a good anti-slip capability in strong wind, whereas in extreme weather, the wind force is usually far larger than the maximum friction that can be produced by the device; the device is therefore not safe enough.

A rail clamping-type anti-slip device is used to clamp the head of the rail, by way of which a friction is provided, and this friction acts to resist wind. Such a device is advantages in that it can produce a large clamping force and is usually safe and reliable, but limited by the size of the port facility and the installation space, it can merely produce a finite clamping force, and therefore is only suitable for use in common strong wind.

The above three types of anti-slip devices are widely used in various port facilities at present. However, when extreme weather conditions occur, those port facilities are still often turned over or fall into the sea by strong wind due to insufficient capability or malfunction of anti-slip devices thereof. These accidents severely affect normal operations in ports and meanwhile result in economic loss to the ports. It is therefore urgently desirable by the ports to provide a safe and reliable anti-slip device, for addressing the problem that port facilities slide along their rails in extreme weather and are further turned over due to inertial force.

SUMMARY OF THE INVENTION

The objective of the present disclosure is to provide a self-locking anti-slip rail braking device, which is capable of using wind force to realize a tight clamp of the rail by a port facility. The rail braking device is characterized by its well-designed structure, good anti-slip capacity, safety and reliability, and can be sued to solve the problem that port facilities are forced to slide along their rails in strong wind and are further turned over due to inertial force.

In order to achieve the above objective, the present disclosure provides the following technical solution. A self-locking anti-slip rail braking device comprises: a ladder-shaped support 1, a lifting unit 2, a roller-and-wedge plate mechanism 3, a roller support 4, and a rail clamping unit 5. The ladder-shaped support is connected under a surface of a balance beam of a port facility, and its middle part is connected with the lifting unit. A lower end of the lifting unit is hinged to two sides of the roller support 4. The roller support is provided on an upper end surface thereof with the roller-and-wedge plate mechanism 3, and is provided at a middle part thereof with the rail clamping unit 5. An upper end of the rail clamping unit serves as a force application end and is configured to match the roller-and-wedge plate mechanism, and a lower end of the rail clamping unit serves as a rail clamping end corresponding to two lateral sides of a rail 7.

According to the above solution, the ladder-shaped support 1 comprises a ladder-shaped supporting frame 8. The ladder-shaped supporting frame is provided at a middle part thereof with a lifting wheel supporting plate 9, and is symmetrically provided at two ends of a lower part thereof with two inclined roller-pressing plates 10 which, together with a lower middle plate arranged below the lifting wheel supporting plate, form a trapezoid cross-sectional cavity with a longer base of the trapezoid as a bottom.

According to the above solution, the lifting unit 2 comprises two pairs of lifting supporting wheels. Each pair of the lifting supporting wheels includes a supporting wheel axle 12 and supporting wheels 14 arranged at two ends of the supporting wheel axle. A telescoping mechanism 13 is connected between the supporting wheel axles of the two pairs of lifting supporting wheels. The two pairs of the lifting supporting wheels are arranged respectively on two ends of the lifting wheel supporting plate of the ladder-shaped support, and are configured to be movable back and forth along a length direction of the lifting wheel supporting plate. Two ends of each of the supporting wheel axles are hinged with the lifting rods 11. Lower ends of the two pairs of the lifting rods are hinged to the two sides of the roller support 4, respectively. The two pairs of the lifting rods incline outwards in a downward direction, thereby forming, together with the telescoping mechanism and the roller support to which they are respectively hinged, an isosceles trapezoid-shaped four-bar linkage mechanism. Ascending and descending of the roller support is realized through changing an interior angle of the isosceles trapezoid by collapsing and extending of the telescoping mechanism.

According to the above solution, the telescoping mechanism is a hydraulic telescopic oil cylinder, and provided are two hydraulic telescopic oil cylinders which are arranged in a spaced-apart manner along an axial direction of the supporting wheel axle.

According to the above solution, the roller-and-wedge plate mechanism 3 comprises a wedge plate and roller carriers connected at two ends of the wedge plate. Rollers 16 are arranged in the roller carriers with the aid of roller axles 18. The wedge plate is concave in its middle, and is configured at two ends thereof with wedge-shaped surfaces gradually projecting outwards, providing a wedge-shaped roller groove. The wedge-shaped roller grooves of the wedge plate are symmetrically disposed at two sides of the wedge plate and are configured to match the upper end of the rail clamping unit. The rollers are located in a cavity of the trapezoid cross-sectional cavity formed by the upper end surface of the roller support and the ladder-shaped support, and are configured to be movable back and forth along the length direction of the roller support.

According to the above solution, the roller support 4 comprises a roller supporting structure 23 which is formed by two symmetrically arranged housings that are secured to each other through an intermediate connecting rack. The roller supporting structure is provided at two ends of a front side and a back side thereof with lower hinge shaft supports 26, by which the roller supporting structure is hinged with the four lifting rods 11 of the lifting unit. At two sides of the intermediate connecting rack of the roller supporting structure, at a lower part inside the two housings, clamping arm rotation axle supports 27 are provided, respectively. The intermediate connecting rack is provided on an upper end thereof with a return spring 25.

According to the above solution, the roller supporting structure 23 is provided with, in a middle part of a lower end surface thereof, with a rail pressing plate 28.

According to the above solution, the rail clamping unit 5 includes rail clamping arms 20 symmetrically arranged at two sides of a middle part of the roller supporting structure 23. Each of the rail clamping arms is hinged at an lower end thereof with the roller supporting structure 23 through the clamping arm rotation axle support 27, and each of the rail clamping arms is further provided on an inner side thereof with a rail clamping block 22, providing the rail clamping end corresponding to the two lateral sides of the rail 7. An upper part of the rail clamping arm is connected with the return spring. An upper end of the rail clamping arm is provided thereon with a rail clamp regulating roller 19 which is configured to match the wedge-shaped roller groove of the wedge plate of the roller-and-wedge plate mechanism 3, providing the force application end of the rail clamping unit.

The present disclosure brings the following beneficial effects. Despite of the operating state and position of the port facility, the self-locking anti-slip rail braking device is always ready to enter into a working state for resisting wind and slide. When the port facility is in normal operation, the telescoping mechanism of the lifting unit is collapsed; the roller support is lifted and the rail pressing plate on the lower surface of the roller support is out of contact with the top of the rail; and the rail clamping unit is in a released state.

When the port facility is in a non-working state or needs to be protected from wind, the telescoping mechanism of the lifting unit is extended; the roller supported is lowered and the rail pressing plate on the lower surface of the roller support is in tight contact with the top of the rail; and the self-locking anti-slip rail braking device automatically enters into its working state. Compared with existing anti-slip devices, the self-locking anti-slip rail braking device of the present disclosure uses wind force directly as a source of power, and clamps the rail tightly by means of the roller-and-wedge plate mechanism and the rail clamping unit. The rail braking device's anti-slip capacity is in direction proportion to the wind force. The larger the wind force is, the larger the clamping force and the pressure on the rail top are, and the stronger the rail braking device's anti-slip capacity is. The self-locking anti-slip rail braking device of the present disclosure can be used to solve the problem that port facilities slide along their rails in extreme weather and are further turned over due to inertial force. The rail braking device has a good anti-slip capacity, and is safe, reliable, convenient to operate, and environmentally friendly.

DETAILED DESCRIPTION OF THE EMBODIMENTS

The present disclosure will be illustrated further in detail in conjunction with the embodiments and accompanying drawings.

Figure 1:
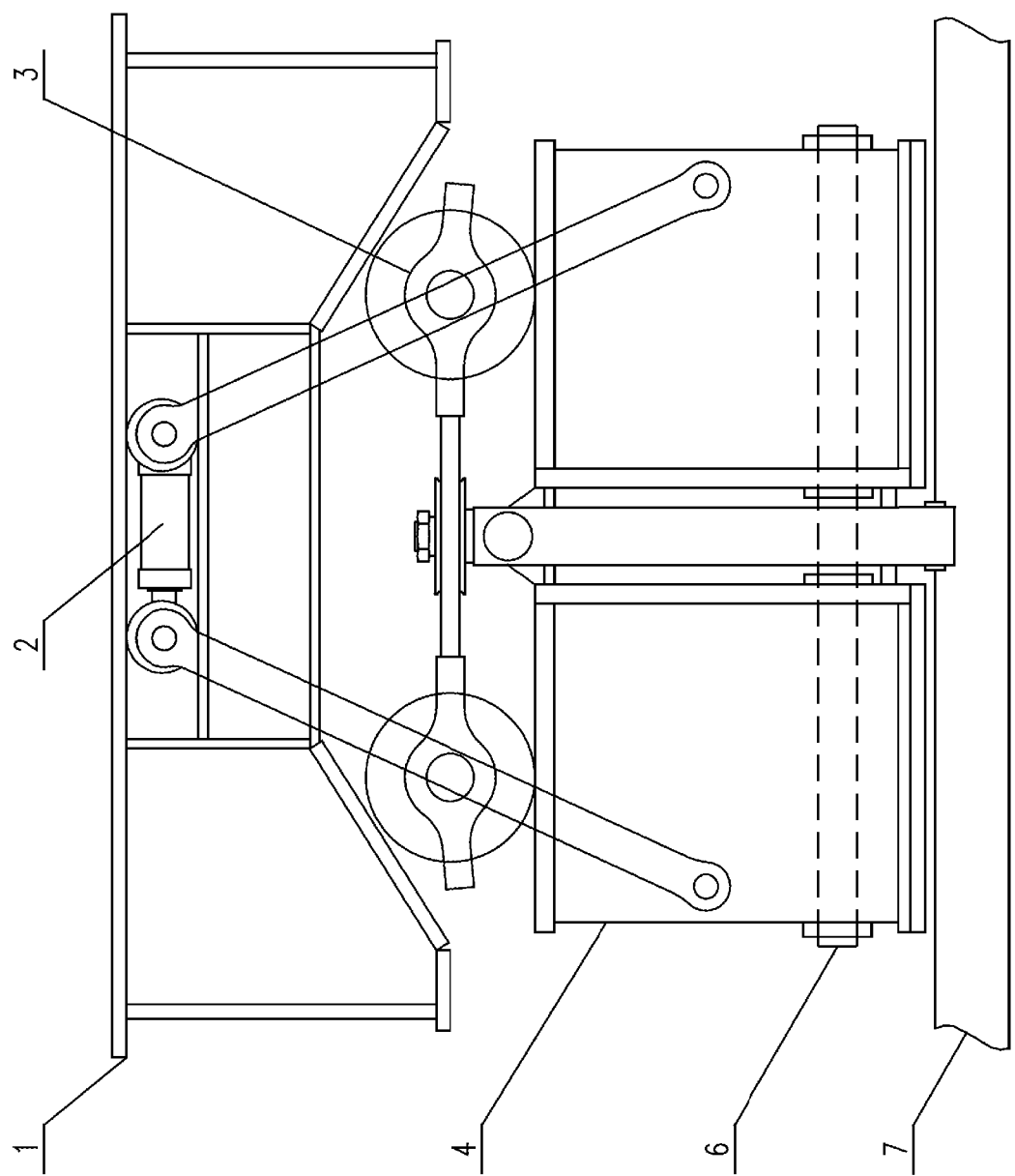
FIG. 1 is a front structural view of a self-locking anti-slip rail braking device according to an embodiment of the present disclosure.
Figure 2:
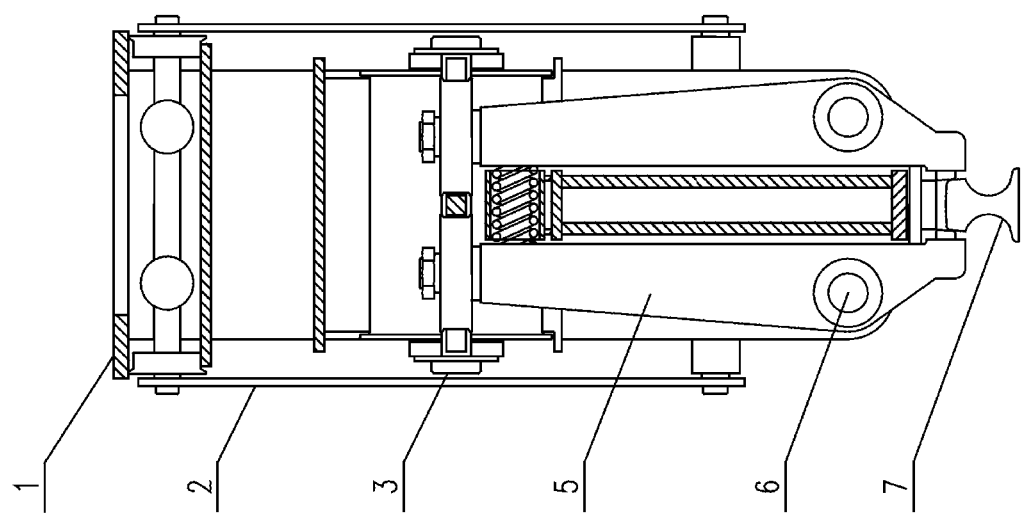
FIG. 2 is a side sectional view of the rail braking device shown in FIG. 1.

As shown in FIGS. 1 and 2, a self-locking anti-slip rail braking device comprises a ladder-shaped support 1, a lifting unit 2, a roller-and-wedge plate mechanism 3, a roller support 4, and a rail clamping unit 5. The ladder-shaped support 1 is connected under a surface of a balance beam of a port facility. The ladder-shaped support 1 is used for supporting the lifting unit 2, and for pushing, via wind, the roller-and-wedge plate mechanism 3 to move when the self-locking anti-slip rail braking device is in operation. Lifting supporting wheels 14 of the lifting unit 2 are provided on a lifting wheel supporting plate 9, and are movable freely along a length direction of the lifting wheel supporting plate 9. A lifting rod 11 of the lifting unit 2 is hinged, through a lower hinge shaft 15, to a lower hinge shaft support 26 on the roller support 4. The lifting unit 2 regulates an angle between the lifting rod 11 and a vertical direction through a telescoping mechanism 13, by way of which the roller support 4 is forced to move up and down. Rollers 16 at two ends of the roller-and-wedge plate mechanism 3 are disposed on an upper surface of the roller support 4, and are movable back and forth along a length direction of the roller support 4. Wedge plate 17 is sandwiched between rail clamp regulating rollers 19 provided at two sides of the wedge plate 17. When the rollers 16 are forced to move by lateral pressures applied thereupon, the wedge plate 17 moves along roller grooves of the rail clamp regulating rollers 19. The upper surface of the roller support 4 is tangent to the rollers 16 of the roller-and-wedge plate mechanism 3. The lower hinge shaft support 26 is hinged, through the lower hinge shaft 15, to the lifting rod of the lifting unit 2. The roller support 4 serves, on one hand, to support the roller-and-wedge plate mechanism 3, and on the other, to enable wind to press the roller support 4 closely to a top of a rail 7 so that a friction force can be provided between the top of the rail 7 and the roller support 4. Two clamping arm rotation axles 6 are disposed symmetrically at two sides of the rail 7 along a width direction of the rail 7, and are connected to clamping arm rotation axle supports 27 provided at two sides of the roller support 4, for supporting the rail clamping unit 5 and enabling the rail clamping unit 5 to be rotatable around the clamping arm rotation axles 6. Rail clamping arms of the rail clamping unit are disposed symmetrically in a middle part of the roller support 4, and are respectively hinged to the clamping arm rotation axles 6 provided at the two sides of the rail 7. The rail clamping arms are used to transfer a wind force to the rail clamping unit via the wedge plate 17, so that the rail clamping unit amplifies the wind force and convert the wind force to a clamping force upon a lateral side of the rail 7, thus providing a friction force between the lateral side of the rail and the rail clamping unit 5.

Figure 3:
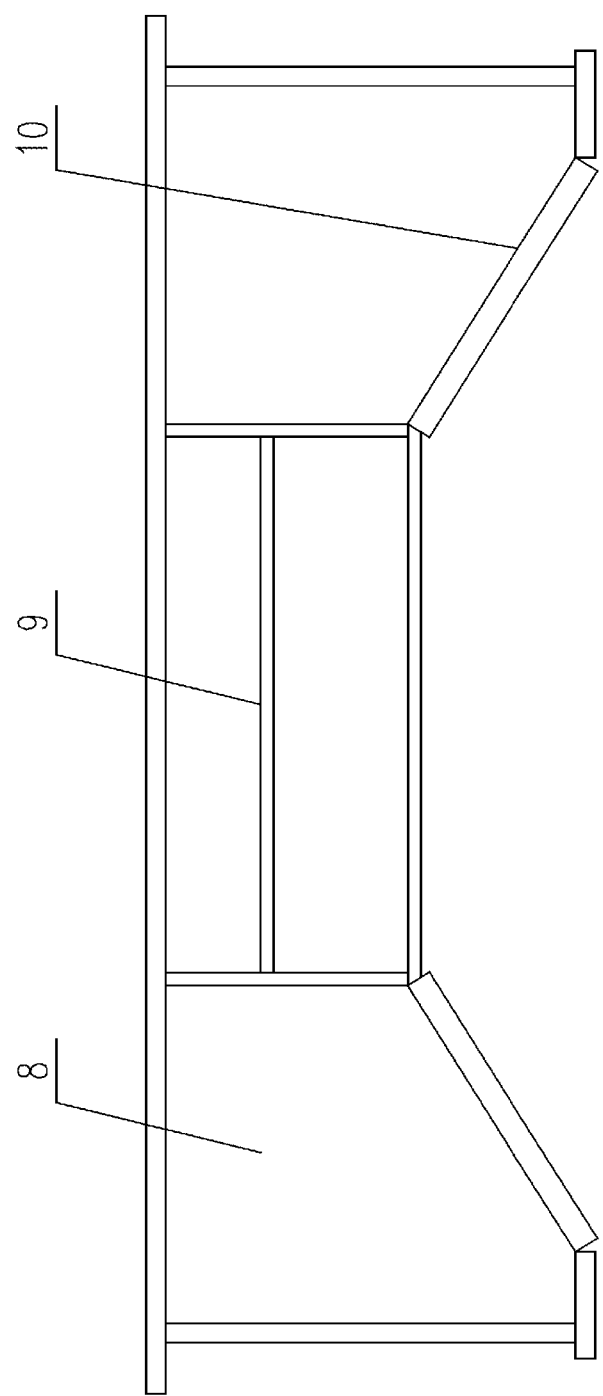
FIG. 3 is a front structural view of a ladder-shaped support according to an embodiment of the present disclosure.
Figure 4:
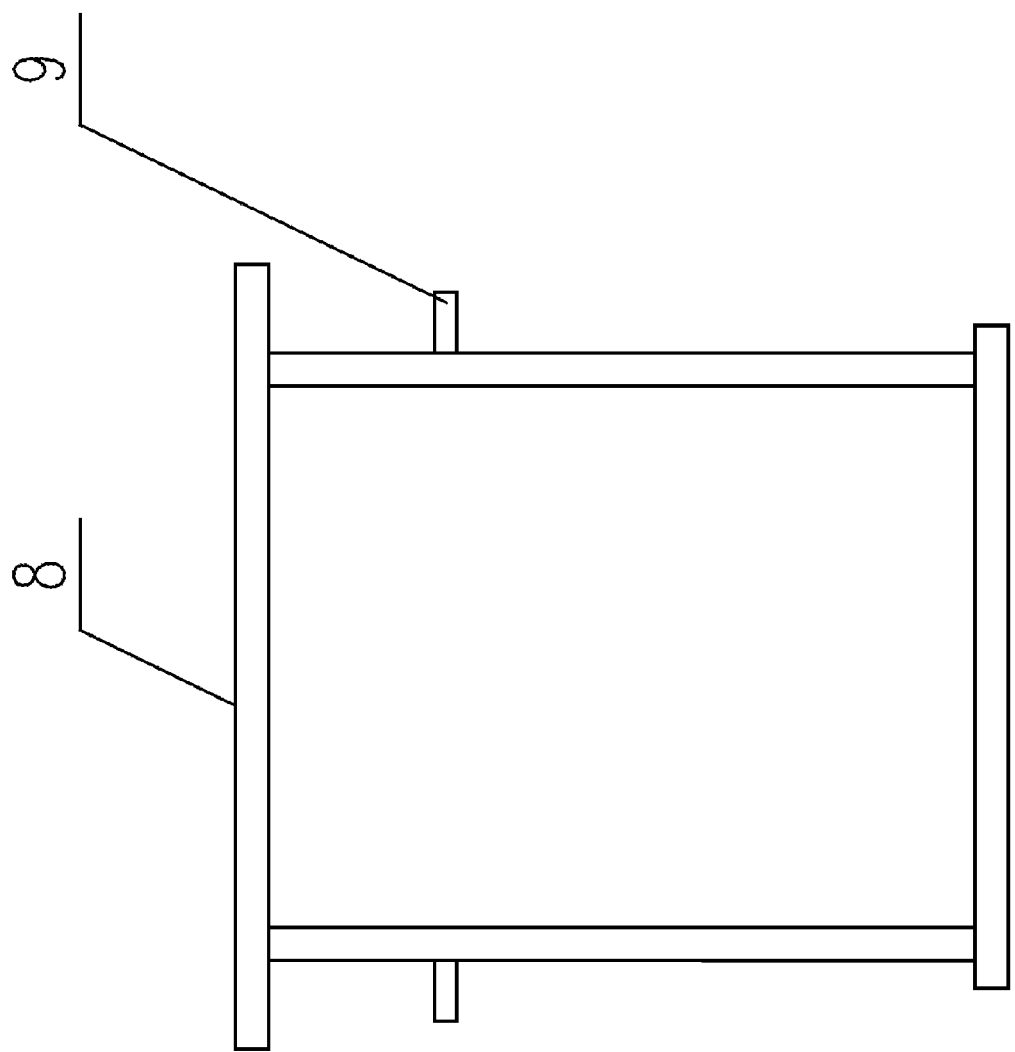
FIG. 4 is a side view of the ladder-shaped support shown in FIG. 3.

As shown in FIGS. 3 and 4, the ladder-shaped support 1 comprises a ladder-shaped supporting frame 8, the lifting wheel supporting plate 9, and inclined roller-pressing plates 10. The ladder-shaped supporting frame 8 is a basic structure for the ladder-shaped support 1. The lifting wheel supporting plate 9 is arranged in a middle part of the ladder-shaped supporting frame 8. The inclined roller-pressing plates 10 are provided symmetrically at two ends of a lower part of the ladder-shaped supporting frame 8. The inclined roller-pressing plates 10 are connected with a lower middle plate provided below the lifting wheel supporting plate 9, forming a trapezoid cross-sectional cavity with a longer base of the trapezoid as a bottom. A lower end of the ladder-shaped support 1 is connected with the balance beam of the port facility, and the lifting wheel supporting plate 9 is secured on the middle part of the ladder-shaped supporting frame 8, by means of which the lifting unit is supported and the lifting supporting wheels 14 of the lifting unit 2 is able to perform telescopic movement along the length direction of the lifting wheel supporting plate 9. The two inclined roller-pressing plates 10 are symmetrically secured at the two ends of the lower part of the ladder-shaped supporting frame 8, for pushing the roller-and-wedge plate mechanism 3 to move on the upper surface of the roller support 4 along the length direction of the upper surface of the roller support 4, and meanwhile for distributing component forces in horizontal and vertical directions.

Figure 5:
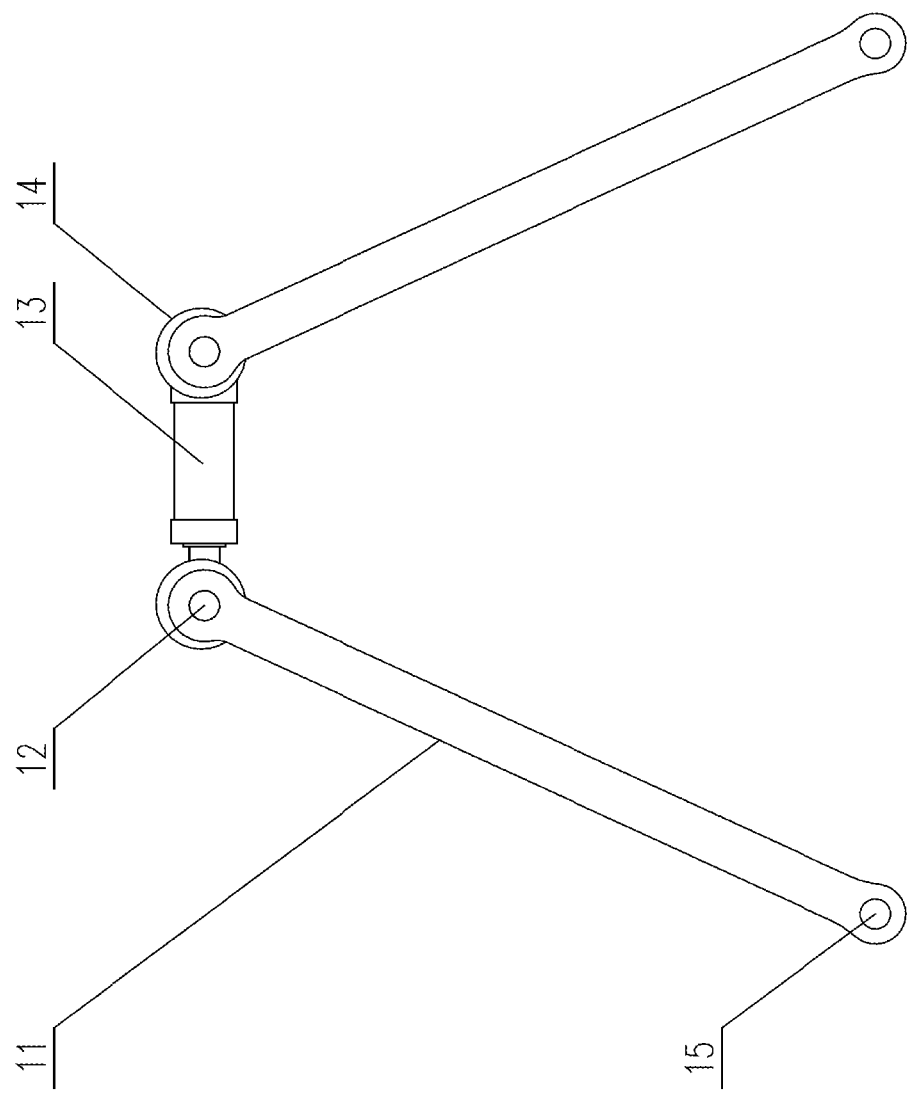
FIG. 5 is a structural view of a lifting unit according to an embodiment of the present disclosure.
Figure 6:
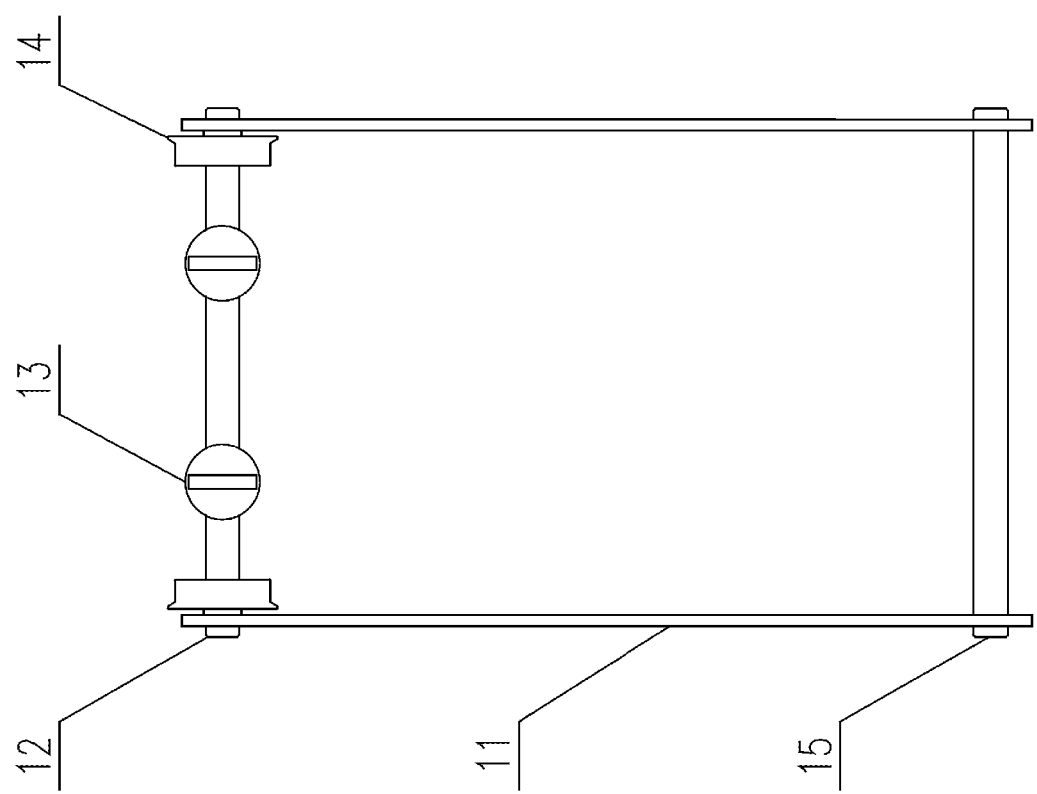
FIG. 6 is a side view of the lifting unit shown in FIG. 5.

As shown in FIGS. 5 and 6, the lifting unit 2 comprises two pairs of lifting supporting wheels. Each pair of the lifting supporting wheels include a supporting wheel axle 12 and supporting wheels 14 arranged at two ends of the wheel axle. The supporting wheel axles of the two pairs of the lifting supporting wheels are connected with each other through a telescoping mechanism 13. The telescoping mechanism 13 is a hydraulic telescopic oil cylinder, and provided are two hydraulic telescopic oil cylinders which are arranged in a spaced-apart manner along an axial direction of the supporting wheel axle. The two pairs of the lifting supporting wheels are arranged on two ends of the lifting wheel supporting plate 9 of the ladder-shaped support, respectively. The supporting wheel 14 is configured with an outer rim for matching a side surface of the lifting wheel supporting plate. The supporting wheel 14 is movable back and forth along the length direction of the lifting wheel supporting plate. The two ends of the supporting wheel axle are hinged with the lifting rods 11. Lower ends of the two pairs of the lifting rods are hinged, through the lower hinge shafts 15, to lower hinge shaft supports 26 provided on the two sides of the roller support 4, respectively. The two pairs of the lifting rods incline outwards in a downward direction. Each pair of the lifting rods, together with the telescoping mechanism and the roller support to which they are respectively hinged, forms an isosceles trapezoid-shaped four-bar linkage mechanism. Lifting of the roller support is realized through changing an interior angle of the isosceles trapezoid by the telescoping mechanism.

Figure 7:
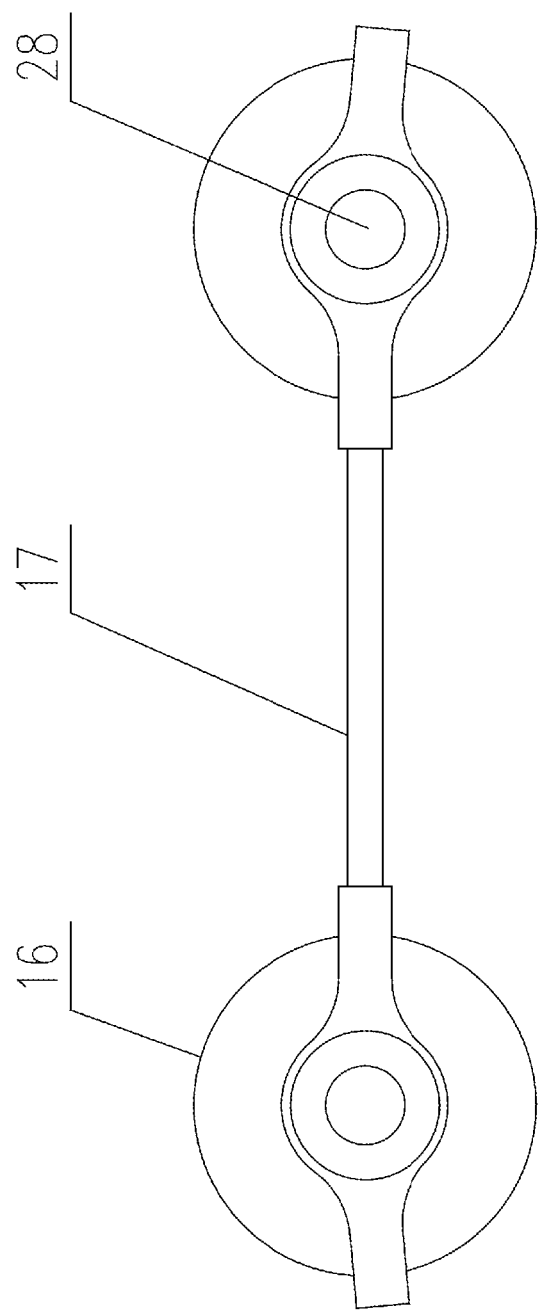
FIG. 7 is a front structural view of a roller-and-wedge plate mechanism according to an embodiment of the present disclosure.
Figure 8:
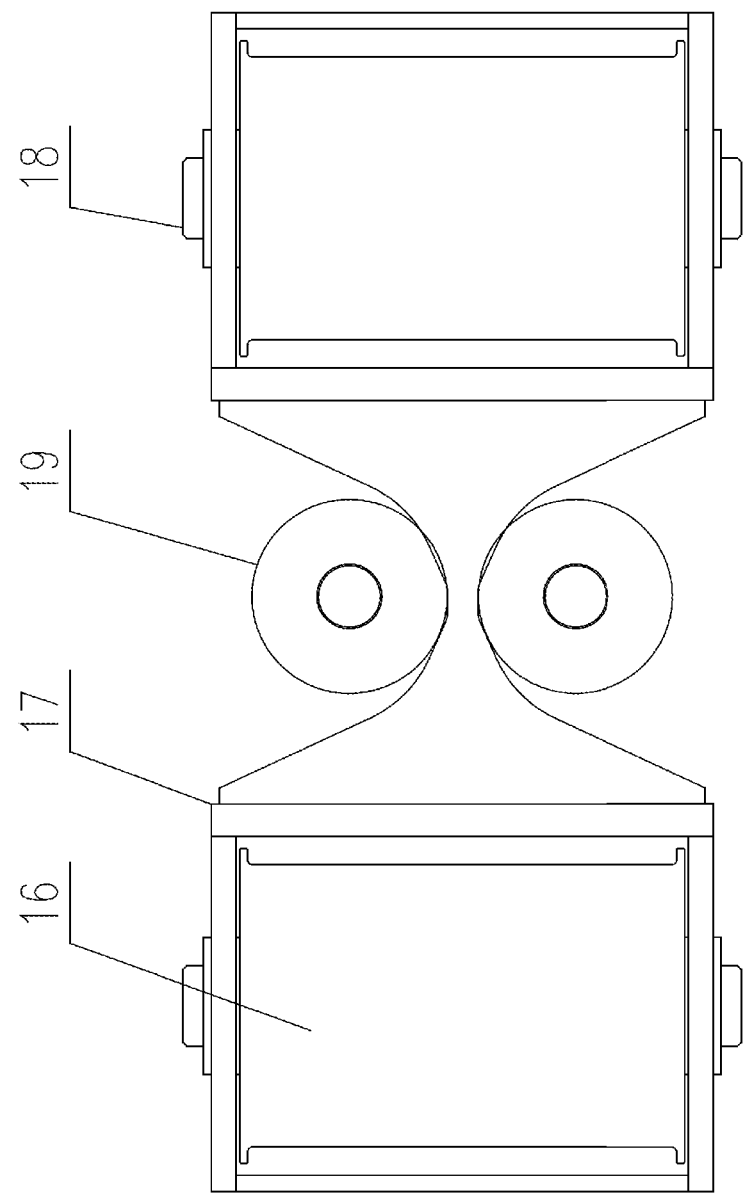
FIG. 8 is a top view of the roller-and-wedge plate mechanism shown in FIG. 7.

As shown in FIGS. 7 and 8, the roller-and-wedge plate mechanism 3 comprises the wedge plate 17, and roller carriers connected at two ends of the wedge plate. The roller 16 is arranged in the roller carrier with the aid of a roller axle 18. The wedge plate is concave in its middle, and is configured at two ends thereof with wedge-shaped surfaces gradually projecting outwards, providing wedge-shaped roller grooves. The wedge-shaped roller grooves of the wedge plate are symmetrically disposed at two sides of the wedge plate and are configured to match an upper end of the rail clamping unit 5. The rollers are located in a cavity of the trapezoid cross-sectional cavity formed by the upper surface of the roller support and the ladder-shaped support, and are movable back and forth along the length direction of the roller support. The wedge plate 17 serves to push apart the rail clamp regulating rollers 19 at the two sides thereof to enlarge a distance between the rail clamp regulating rollers 19 when the rollers 16 moves on the upper surface of the roller support 4 along the length direction of the roller support 4. In this way, the component force of the wind force in the horizontal direction is converted to the clamping force upon the lateral side of the rail 7.

Figure 10:
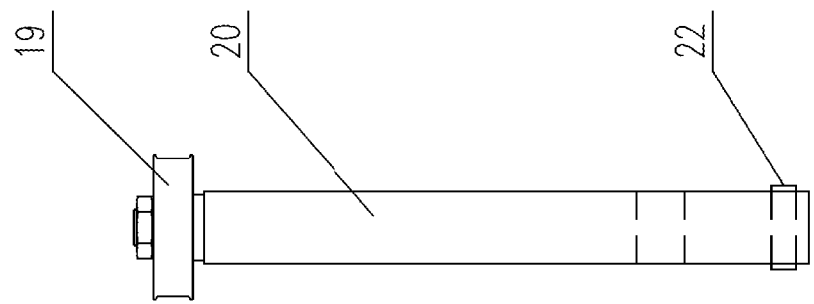
FIG. 10 is a side view of the rail clamping unit shown in FIG. 9.
Figure 9:
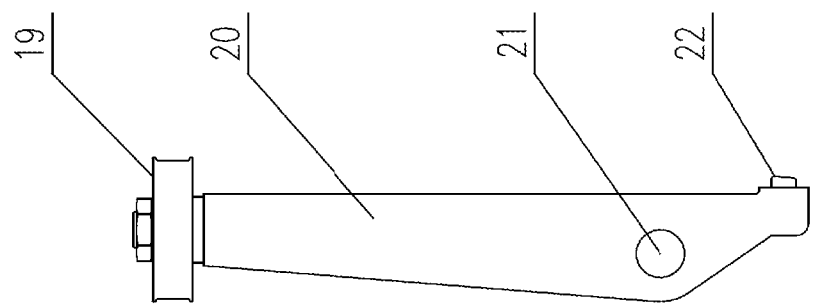
FIG. 9 is a structural view of a rail clamping unit according to one embodiment of the present disclosure.

As shown in FIGS. 9 and 10, the rail clamping unit 5 includes rail clamping arms 20 symmetrically arranged at two sides of a middle part of a roller supporting structure 23. Each of the rail clamping arms is provided therein with a hinge hole 21 which is hinged with the roller supporting structure 23 through the clamping arm rotation axle 6 and the clamping arm rotation axle support 27. Each of the rail clamping arms is further provided on an inner side thereof with a rail clamping block 22. The rail clamping blocks 22 provides a rail clamping end corresponding to the two lateral sides of the rail 7. An upper part of the rail clamping arm is connected to a return spring 25, and an upper end of the rail clamping arm is provided thereon with the rail clamp regulating roller 19 which matches the wedge-shaped roller groove of the wedge plate 7 of the roller-and-wedge plate mechanism, providing a force application end of the rail clamping unit.

Figure 11:
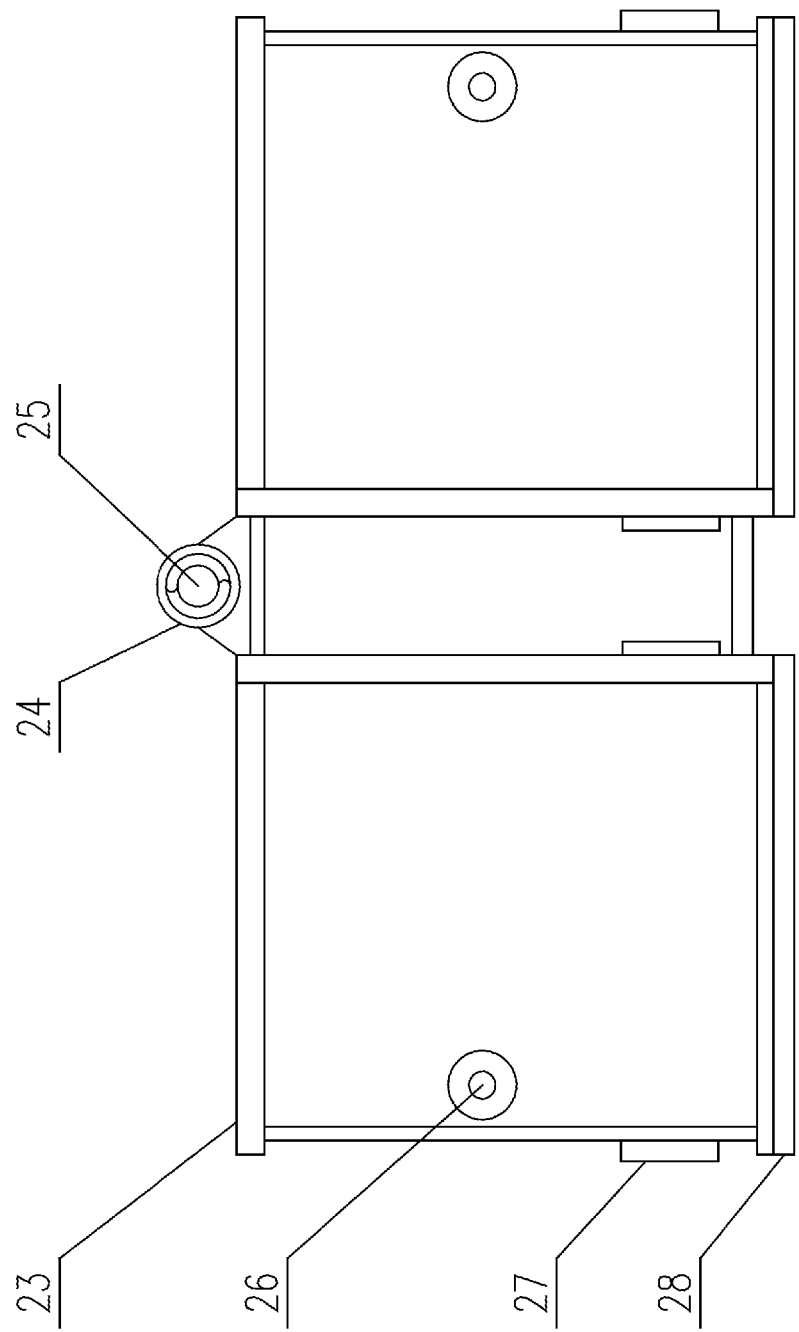
FIG. 11 is a front structural view of a roller support according to one embodiment of the present disclosure.
Figure 12:
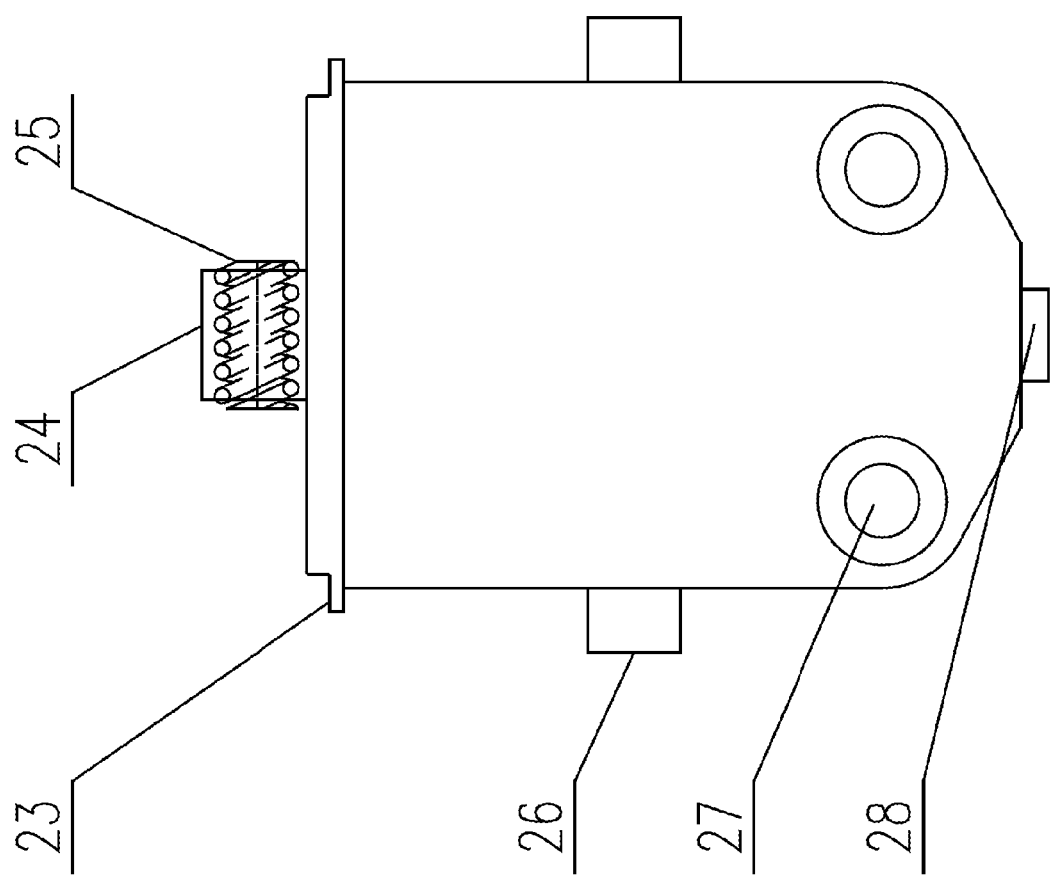
FIG. 12 is a side view of the roller support shown in FIG. 11.

As shown in FIGS. 11 and 12, the roller support 4 comprises the roller supporting structure 23 which is formed by two symmetrically arranged housings that are secured to each other through an intermediate connecting rack. The roller supporting structure is provided at two ends of a back side and a front side thereof with the lower hinge shaft supports 26. The roller supporting structure is hinged with the four lifting rods 11 of the lifting unit through the lower hinge shaft supports 26. At two sides of the intermediate connecting rack of the roller supporting structure, at a lower part inside the two housings, the clamping arm rotation axle supports 27 are provided, respectively, for passing through and holding the clamping arm rotation axes 6. The intermediate connecting rack is provided on an upper end thereof with a spring seat 24 on which the return spring 25 is arranged. The roller supporting structure 23 is provided with, in a middle part of a bottom end thereof, with a rail pressing plate 28. When the self-locking anti-slip rail braking device is in operation, the wind force presses the rail pressing plate 28 closely to the top of the rail 7, producing a large friction force between the roller support and the top of the rail.

Figure 13:
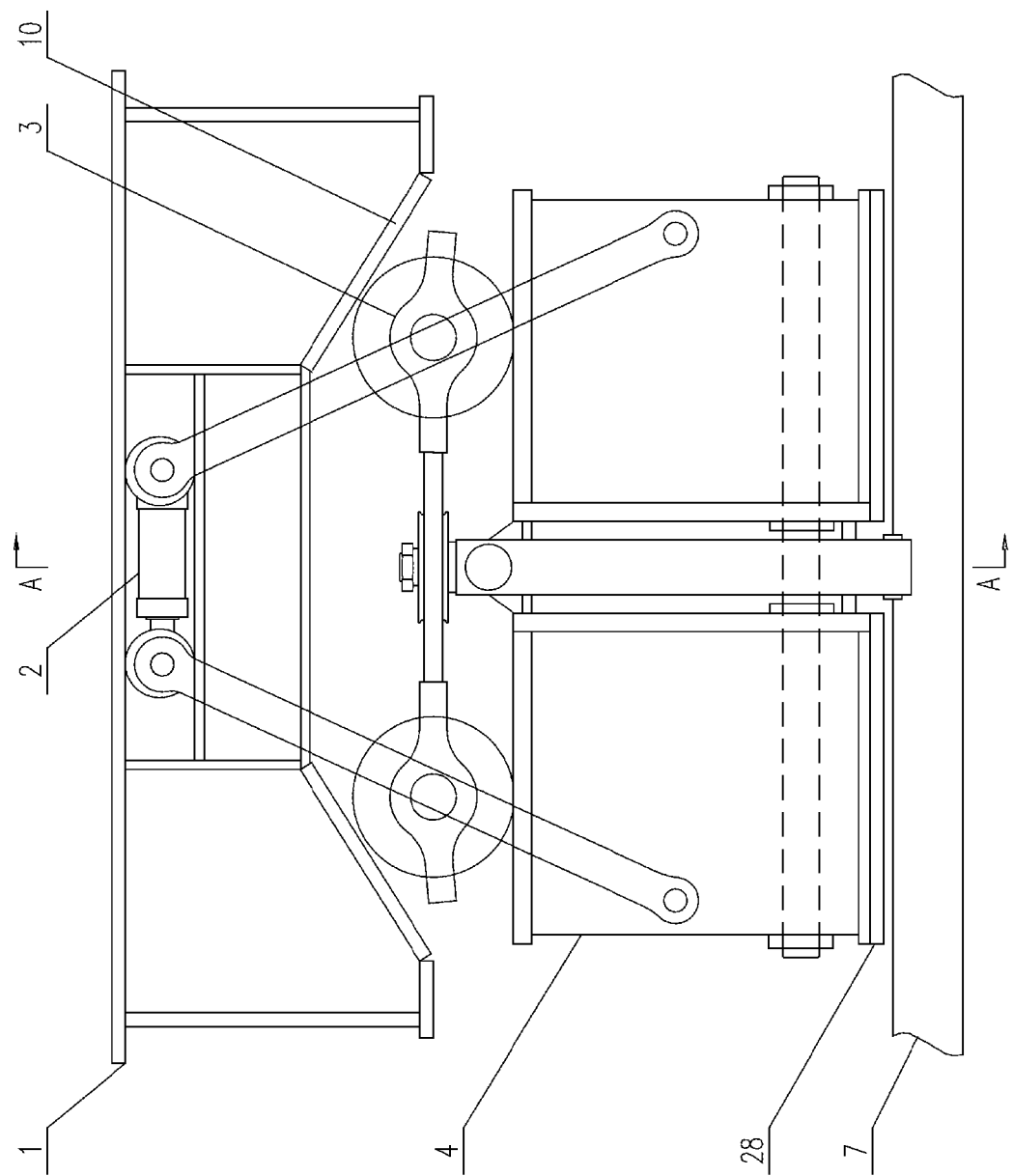
FIG. 13 schematically shows a non-working state of the rail braking device according to one embodiment of the present disclosure.
Figure 14:
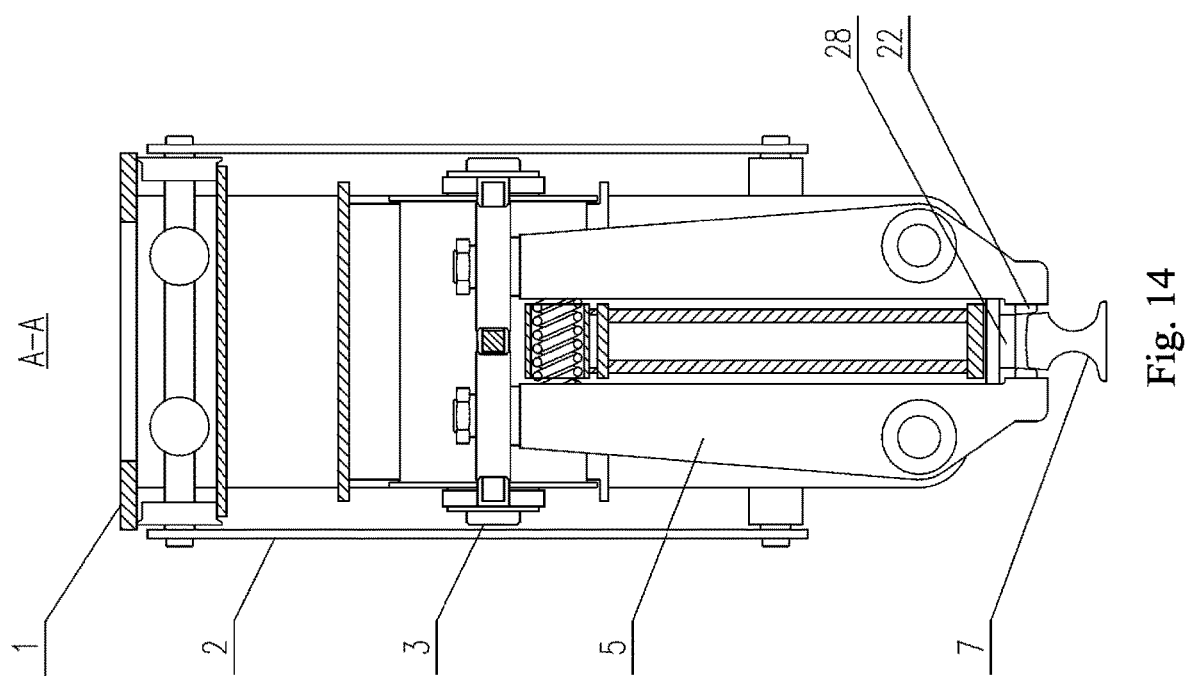
FIG. 14 is a section view of the rail braking device shown in FIG. 13 along line A-A.

As shown in FIGS. 13 and 14, when the self-locking anti-slip rail braking device is in a non-working state, the lifting unit 2 is in a lifted state and the telescopic oil cylinder 13 of the lifting unit is in a collapsed state. By collapsing the hydraulic oil cylinder 13, the upper ends of the lifting rods 11 are pulled to move to a center direction of the hydraulic oil cylinder 13. The collapsing of the telescoping mechanism changes the inner angle of the isosceles trapezoid, thus realizing the lifting of the roller support. In this case, the rail pressing plate 28 provided on the bottom end of the roller support 4 is separated from the rail 7, and no friction force is produced between the two. Meanwhile, the roller-and-wedge plate mechanism 3 on the roller support 4 and the rail clamping unit 5 also ascend with the roller support 4. When the roller support 4 ascend to a maximum height, there is only a small space between the rollers 16 on the two ends of the roller-and-wedge plate mechanism 3 and the inclined roller-pressing plate 10 on the two ends of the lower part of the ladder-shaped support 1, and the rail clamping blocks 22 of the rail clamping unit 5 are separated from the lateral sides of the rail 7. During movement of the port facility, the roller-and-wedge plate mechanism 3 slides only when an inertia force is acted thereupon; therefore, the roller-and-wedge plate mechanism 3 cannot produce a pushing force large enough to cause the rail clamp regulating rollers 19 of the rail clamp unit 5 to move away outward from each other, and the rail clamping blocks 22 of the rail clamping unit 5 cannot move towards each other to closely clamp the rail 7 and produce any friction force between the rail clamping blocks 22 and the rail 7. In other words, when the self-locking anti-slip rail braking device is in a non-working state, it cannot produce any friction force preventing the movement of the port facility.

Figure 15:
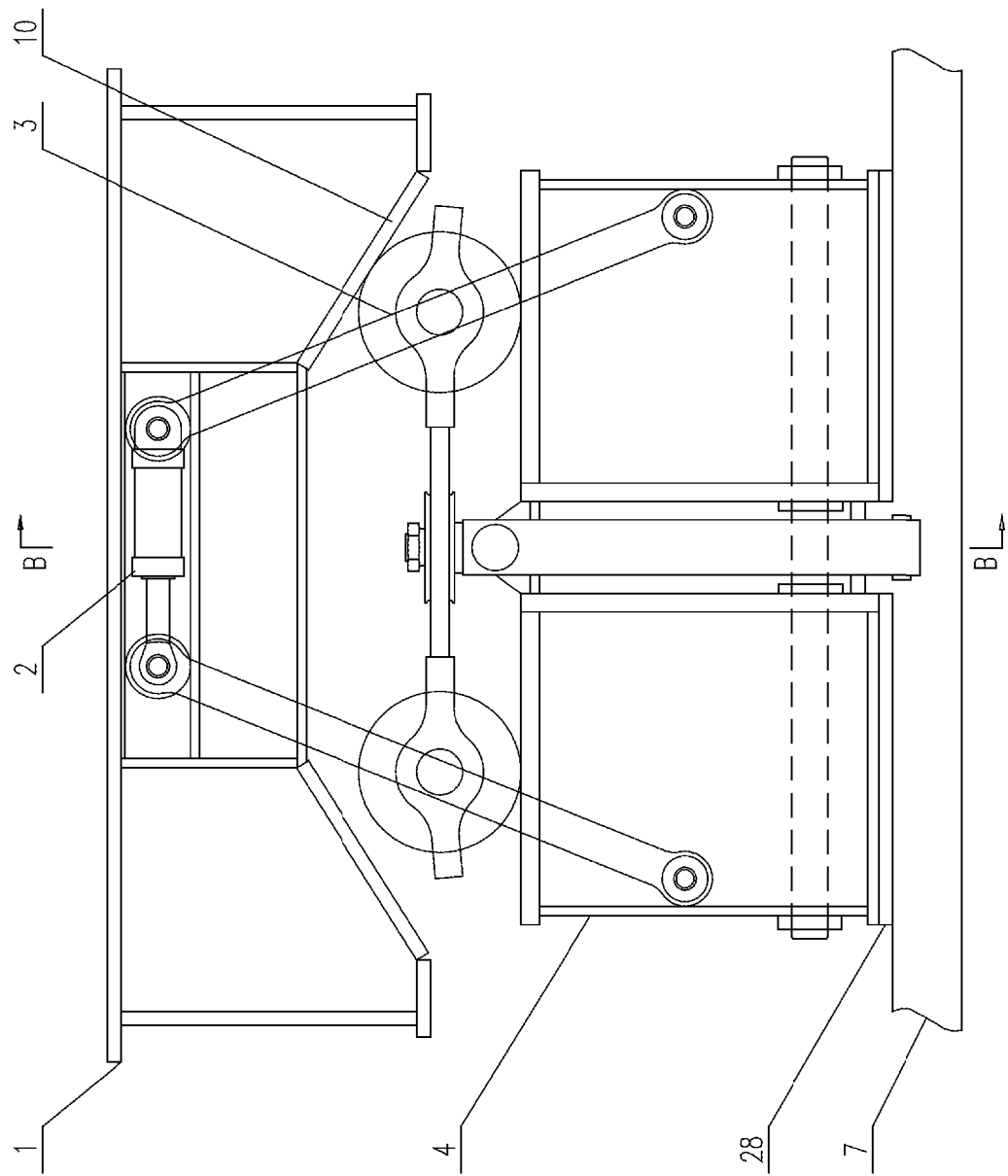
FIG. 15 schematically shows a working state of the rail braking device according to one embodiment of the present disclosure and FIG. 16 is a section view of the rail braking device shown in FIG. 15 along line B-B.
Figure 16:
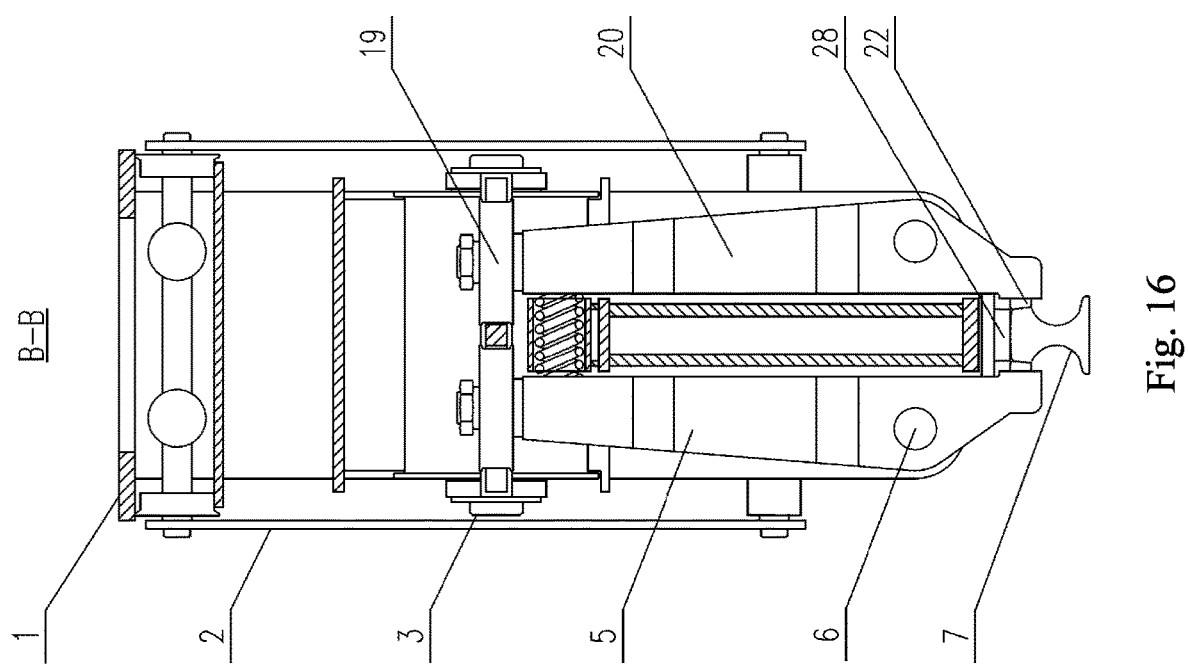

As shown in FIGS. 15 and 16, when the self-locking anti-slip rail braking device is in a working state, the telescopic oil cylinder of the lifting unit 2 extends outward and starts to unload, causing the upper ends of the lifting rods 11 to move away from each other. The extending of the telescoping mechanism changes the inner angle of the isosceles trapezoid, thus realizing the descending of the roller support. The roller support 4 also gradually descends due to gravity. A projected length of the lifting rod 11 in the vertical direction keeps increasing, finally enabling the rail pressing plate 28 on the bottom surface of the roller support 4 to come into close contact with the top of the rail 7. The roller-and-wedge plate mechanism 3 on the roller support 4 and the rail clamping unit 5 also descend with the roller support 4 to a working position, leaving a space between the rollers 16 on the roller-and-wedge plate mechanism 3 and the inclined roller-pressing plate 10 on the two ends of the lower part of the ladder-shaped support 1. When the wind force is large enough to push the port facility to slide along the rail 7, the ladder-shaped support 1 connected to the lower end of the balance beam of the port facility slides together with the port facility. When the inclined roller-pressing plate 10 of the ladder-shaped support 1 moves relative to the roller support 4 and comes into contact with the roller 16 of the roller-and-wedge plate mechanism 3 and pushes the roller 16 to one side, the inclined roller-pressing plate 10 transfers the wind force to the roller 16 and exerts a horizontal force and a vertical force on the roller 16. The horizontal component force pushes the roller-and-wedge plate mechanism 3 to move to one side along the upper surface of the roller support 4, during which the wedge plate 17 of the roller-and-wedge plate mechanism 3 keeps pushing outward the rail clamp regulating rollers 19 provided on two ends of the top of the rail clamping unit 5, so that the distance between the rail clamp regulating rollers 19 is constantly increased. In the meantime, because the rail clamping arms 20 of the rail unit 5 each are rotatable around a respective one of the clamping arm rotation axles 20, the distance between the rail clamping blocks 22 on the lower ends of the rail clamping unit 5 is constantly decreased. As the wind force increases, the roller-and-wedge plate mechanism 3 moves farther along the length direction of the roller support 4, as a consequence of which, the distance between the rail clamp regulating rollers 19 provided on the two ends of the top of the rail clamping unit 5, resulted from the push of the wedge plate 17, increases. As a result, after the horizontal component force of the wind force is amplified by the rail clamping arms 20 and then transferred to the rail clamping blocks 22 on the lower ends of the rail clamping unit 5, a larger clamping force is applied on the lateral sides of the rail. The wind-resistant and slide-resistant friction force provided by the self-locking anti-slip rail braking device consists of two parts: the friction force produced between the roller support 4 and the top of the rail 7, and the friction force produced between the rail clamping unit and the lateral sides of the rail 7. Both of the two friction forces mainly come from the wind force and are in direction proportion to the wind force. The larger the wind force is, the larger the friction force produced by self-locking anti-slip rail braking device is. A wind-resistant and slide-resistant force of the port facility consists of a friction force produced by a dead weight of the port facility itself and the friction force produced by the self-locking anti-slip rail braking device. Since the friction force produced by the self-locking anti-slip rail braking device is in direct proportion to the wind force, the wind-resistant and slide-resistant force of the port facility is always larger than wind load; therefore, the port facility is not able to slide/move along the rail 7 due to a too large wind force. Desired wind-resistance and slide-resistance is thus achieved.

What is claimed is:

1. A self-locking anti-slip rail braking device, comprising:
a trapezoid-shaped support (1), a lifting unit (2), a roller-and-wedge plate mechanism (3), a roller support (4), and a rail clamping unit (5),
wherein the trapezoid-shaped support (1) is connected to a balance beam of a port facility at a lower surface of a balance beam, and the lifting unit (2) is connected to a middle part of the trapezoid-shaped support (1),
wherein a lower end of the lifting unit (2) is hinged to two sides of the roller support (4),
wherein the roller-and-wedge plate mechanism (3) is disposed on an upper end surface of the roller support (4), and the rail clamping unit (5) is provided at a middle part of the roller support (4),
wherein an upper end of the rail clamping unit (5) is configured to match the roller-and-wedge plate mechanism (3), and a lower end of the rail clamping unit (5) serves as a rail clamping end corresponding to two lateral sides of a rail (7),
wherein the trapezoid-shaped support (1) comprises a trapezoid-shaped supporting frame (8), wherein the trapezoid-shaped supporting frame is provided at a middle part thereof with a lifting wheel supporting plate (9), and is symmetrically provided at two ends of a lower part thereof with two inclined roller-pressing plates (10) which, together with a lower middle plate arranged below the lifting wheel supporting plate, form a trapezoid cross-sectional cavity with a longer base of the trapezoid as a bottom.

2. The self-locking anti-slip rail braking device according to claim 1, wherein:
the lifting unit (2) comprises two pairs of lifting supporting wheels, each pair of the lifting supporting wheels including a supporting wheel axle (12) and supporting wheels (14) arranged at two ends of the supporting wheel axle,
a telescoping mechanism (13) is connected between the supporting wheel axles of the two pairs of lifting supporting wheels, and the two pairs of the lifting supporting wheels are arranged respectively on two ends of the lifting wheel supporting plate of the trapezoid-shaped support, and are configured to be movable back and forth along a length direction of the lifting wheel supporting plate,
two ends of each of the supporting wheel axles are hinged with lifting rods (11), and
lower ends of the two pairs of the lifting rods are hinged to the two sides of the roller support (4), respectively, and the two pairs of the lifting rods incline outwards in a downward direction, thereby forming, together with the telescoping mechanism and the roller support to which they are respectively hinged, an isosceles trapezoid-shaped four-bar linkage mechanism, wherein ascending and descending of the roller support is realized through changing an interior angle of the isosceles trapezoid by collapsing and extending of the telescoping mechanism.

3. The self-locking anti-slip rail braking device according to claim 2, wherein the telescoping mechanism is a hydraulic telescopic oil cylinder, and provided are two hydraulic telescopic oil cylinders which are arranged in a spaced-apart manner along an axial direction of the supporting wheel axle.

4. The self-locking anti-slip rail braking device according to claim 2, wherein the roller-and-wedge plate mechanism 3 comprises a wedge plate and roller carriers connected at two ends of the wedge plate, wherein:
rollers (16) are arranged in the roller carriers with the aid of roller axles (18),
the wedge plate is concave in its middle, and is configured at two ends thereof with wedge-shaped surfaces gradually projecting outwards, providing a wedge-shaped roller groove, wherein the wedge-shaped roller grooves of the wedge plate are symmetrically disposed at two sides of the wedge plate and are configured to match the upper end of the rail clamping unit, and
the rollers are located in a cavity of the trapezoid cross-sectional cavity formed by the upper end surface of the roller support and the trapezoid-shaped support, and are configured to be movable back and forth along the length direction of the roller support.

5. The self-locking anti-slip rail braking device according to claim 4, wherein the roller support (4) comprises a roller supporting structure (23) which is formed by two symmetrically arranged housings that are secured to each other through an intermediate connecting rack, wherein:
the roller supporting structure is provided at two ends of a front side and a back side thereof with lower hinge shaft supports (26), by which the roller supporting structure is hinged with the four lifting rods (11) of the lifting unit,
at two sides of the intermediate connecting rack of the roller supporting structure, at a lower part inside the two housings, clamping arm rotation axle supports (27) are provided, respectively, and
the intermediate connecting rack is provided on an upper end thereof with a return spring (25).

6. The self-locking anti-slip rail braking device according to claim 5, wherein the rail clamping unit (5) includes rail clamping arms (20) symmetrically arranged at two sides of a middle part of the roller supporting structure (23),
wherein each of the rail clamping arms is hinged at an lower end thereof with the roller supporting structure (23) through the clamping arm rotation axle support (27), and each of the rail clamping arms is further provided on an inner side thereof with a rail clamping block (22), providing the rail clamping end corresponding to the two lateral sides of the rail (7), and
an upper part of the rail clamping arm is connected with the return spring, and an upper end of the rail clamping arm is provided thereon with a rail clamp regulating roller (19) which is configured to match the wedge-shaped roller groove of the wedge plate of the roller-and-wedge plate mechanism (3), providing the force application end of the rail clamping unit.

7. The self-locking anti-slip rail braking device according to claim 5, wherein the roller supporting structure (23) is provided with, in a middle part of a lower end surface thereof, with a rail pressing plate (28).

8. The self-locking anti-slip rail braking device according to claim 7, wherein the rail clamping unit (5) includes rail clamping arms (20) symmetrically arranged at two sides of a middle part of the roller supporting structure (23),
wherein each of the rail clamping arms is hinged at an lower end thereof with the roller supporting structure (23) through the clamping arm rotation axle support (27), and each of the rail clamping arms is further provided on an inner side thereof with a rail clamping block (22), providing the rail clamping end corresponding to the two lateral sides of the rail (7), and an upper part of the rail clamping arm is connected with the return spring, and an upper end of the rail clamping arm is provided thereon with a rail clamp regulating roller (19) which is configured to match the wedge-shaped roller groove of the wedge plate of the roller-and-wedge plate mechanism (3), providing the force application end of the rail clamping unit.

* * * * *